UNITED STATES PATENT OFFICE.

DAMON R. AVERILL, OF NEWBURG, OHIO.

IMPROVEMENT IN PAINTS.

Specification forming part of Letters Patent No. 66,773, dated July 16, 1867; reissue No. 3,051, dated July 28, 1868.

*To all whom it may concern:*

Be it known that I, DAMON R. AVERILL, of Newburg, in the county of Cuyahoga and State of Ohio, have invented a new and useful Improvement in Paints; and I do hereby declare that the following is a full and complete description of one example of the same, of the ingredients used, and of the manner of compounding them.

The object of this invention is to provide a paint which may be supplied to the trade and to consumers in a prepared or mixed condition, in suitable and convenient packages, already for use, and in any color or shade.

In the use of the paints as now prepared great trouble and vexatious delay are encountered in mixing, coloring, and otherwise preparing them for use, as they must be mixed at the time of using them, and used within a short time of mixing, and if there be any residue the mineral part very soon separates from the oil and settles at the bottom in a hard and lumpy mass, totally unfit for use without regrinding. To prepare it in the first place requires the procuring of the several ingredients—such as white lead, oil, turpentine, and the drier—all in separate packages and in various quantities, which must be carefully and skillfully mixed, and in such quantities only as may be readily used. If a colored paint is required many other separate packages of coloring matter must be used, which, if dry, must also be ground, and to procure the shade desired great skill in the application of the coloring matter is necessary; and not only with respect to the proper application of the coloring matter is skill required, but also to prepare the paint so that when it is applied it will be of such temper or consistency as to spread well, and yet retain sufficient body to cover the surface and not run.

Now, to obviate these difficulties I propose to provide a paint susceptible of being mixed and fully prepared at the time of manufacturing it, so that when the packages are opened it will be ready for immediate use, and which will remain in such condition for any indefinite length of time, whether exposed to the atmosphere or not.

It will be readily perceived that a paint so prepared and mixed, when being manufactured where every facility for accomplishing the same with accuracy and uniformity may be had, may be furnished to the consumer, of every color and quality, with the nicest graduations, and at less cost and delay than the present paints of commerce.

To this end I have provided, as one example, the following preparation: I first take two hundred pounds of the oxide of zinc in a dry state, and grind it in twenty gallons of linseed-oil, to which I add a compound prepared as follows, viz: Mix five pounds of the acetate of lead with ten pounds of the sulphate of zinc in a sufficient amount of water to give a specific gravity of 3° Baumé, when the salts are dissolved. I then take a sufficient quantity of the soluble silicate of soda, dissolved in water, to make three gallons having a specific gravity of 8° Baumé. I also prepare six gallons of a saturated solution of lime-water. I now take three gallons of the mixture of the acetate of lead and zinc solution with three gallons of the solution of the silicate of soda, and add six gallons of lime-water and six gallons of linseed-oil. These are all combined, and then compounded with the aforementioned two hundred pounds of ground zinc and oil, after which are added six gallons of benzine, and the whole compound is then thoroughly ground together, producing a white, glossy, cheap, and durable paint, which may receive any color or tint desired by adding coloring matter to it.

White lead or coloring-pigment may be used in place of the aforementioned zinc, when positive colors are desired. The light colors or tints may also be obtained by mixing the pigments in proper proportions with the compound when first prepared.

Various other modifications of the above compound may be used to advantage, as, for instance, as a substitute for the silicate of soda silicate of potash may be used, or carbonate of lime, or chloride of calcium; also, any other suitable oil may be used instead of linseed.

What I claim as my improvement, and desire to secure by Letters Patent, is—

1. A paint composed of the ingredients herein named, and prepared and compounded substantially in the manner specified.

2. I also claim a liquid paint when prepared and mixed for use, in any colors, in its manufacture, and put up in packages for sale, and which may be preserved in such condition, substantially as and for the purpose described.

The above specification of my invention signed by me this 25th day of June, 1868.

Witnesses: D. R. AVERILL.

FRANK BLOCKLEY,

ALEX. F. ROBERTS.